Sept. 26, 1967 AKIRA TANAKA 3,343,229
SEAT BELT BUCKLE

Filed March 30, 1966 2 Sheets-Sheet 1

INVENTOR.
Akira Tanaka
BY
Paul Fitzpatrick
ATTORNEY

INVENTOR.
Akira Tanaka
BY
Paul Fitzpatrick
ATTORNEY

United States Patent Office 3,343,229
Patented Sept. 26, 1967

3,343,229
SEAT BELT BUCKLE
Akira Tanaka, Southfield, Mich., assignor to General Motors Corporation, Detroit, Mich., a corporation of Delaware
Filed Mar. 30, 1966, Ser. No. 538,847
8 Claims. (Cl. 24—77)

My invention relates to improvements in restraining belts such as seat belts for vehicles, and particularly to an improved buckle structure which is reliable, adapted to economical manufacture, and easily and simply assembled. A particular feature of the invention lies in the fact that the operative parts of the buckle may be inserted into a frame or housing as a group and are retained by self-engaging retainer means. A further feature of the invention lies in the provision of a spring member or retainer serving a number of functions, including biasing the operative parts of the mechanism, limiting the movement of such parts in one case, and guiding and locating other elements.

The nature of the invention and the advantages thereof will be apparent from the succeeding detailed description of preferred embodiments of the invention and the accompanying drawings.

Figure 1:
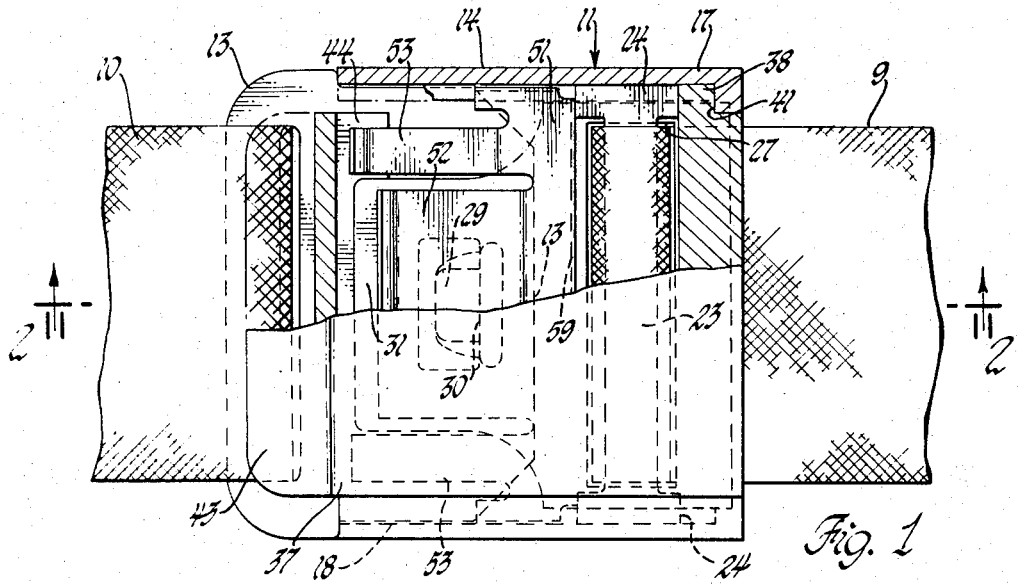
FIGURE 1 is a plan view, with parts cut away and in section, of a seat belt buckle installation.

Before proceeding to the detailed description, it may be pointed out that the two species of the invention have many parts in common and that such parts as are identical in the two species will be given the same reference numeral in the description of both. Those parts which are equivalent but have minor differences of form will be given a number in the species of 1 to 3, and the same number with a prime in the species of FIGURE 4. Thus, in large measure, one description will serve for both species.

It may also be pointed out that the seat belt buckles of this invention incorporate the feature of interconnection between the two sections of the seat belt through the seat belt latch member which is described and claimed in the patent application entitled, "Seat Belt Buckle" of Albert R. Close and Edwin H. Klove, Jr., filed Mar. 30, 1966, Ser. No. 538,737, of common ownership with this application.

Referring to FIGURE 1, the restraining belt or belt assembly of FIGURE 1 includes a first section of belt or webbing 9, a second section of belt or webbing 10, and means to couple the two sections together. The coupling means comprises a buckle assembly 11 and a lock plate or D-ring 13. The belt section 10 is looped through the lock plate and sewed or otherwise fixed together. The lock plate, when it is inserted into the buckle, is locked and retained therein until manually released.

The buckle assembly 11 includes a preferably die cast frame 14 generally of channel section, including a base plate 15 and side walls 17 and 18. Section 9 of the belt is looped around a crossbar 23 extending between the side walls 17 and 18 and terminates in an end section 9a. The length of the seat belt may be increased by pulling on part 9 when the belt is not in tension and decreased by pulling on part 9a. Tension holds the belt against movement through means to be described. The crossbar 23 includes rectangular heads 24 which are floatingly mounted between the side walls so that the crossbar can move up or down as viewed in FIGURE 2 and, except for means to retain it, could move out of the left end of the frame. Slots 25 in the side walls provide a guide for the lock plate 13 when it is inserted into the buckle.

Section 9 of the belt and the lock plate 13 are connected by a latch 26 which is a formed heavy sheet metal plate. The belt 9 extends through an opening 27 in the latch and below a bridge 28 of the latch. A portion of the latch is lanced downwardly to form a pawl 29 which engages the face 30 of the lock plate. The latch also includes a tongue 31 which is engaged by spring means to maintain the latch engaged and by means to release the latch. The latch also includes depending side flanges 33. The ends of the crossbar 23 ride on the portion of the latch above the flanges 33. Note that the belt section 9 is coupled to the latch 26 by passing the bight in the belt upwardly through the opening 27 and then inserting the crossbar 23. In this position, the crossbar locks the belt to the latch, since tension on the belt acting against the latch pulls the crossbar to the right as viewed in FIGURE 2, impinging the belt between the crossbar 23 and the bridge 28 of the latch. The latch 26 directly connects the two sections of the belt, since it directly engages the section 9 and latches to the lock plate 13 which is part of section 10; thus, the belt tension is handled directly through these parts and not through the frame 14.

The buckle also includes a cover 37 substantially coextensive with the base plate and overlying the base plate. The cover includes a pintle 38 extending from each side at the right end thereof which provides a part of a pivotal connection or hinge between the cover and the frame and serves as a locating means for the cover. These pintles may be moved into place through slots or guideways 39 in the side walls into semicylindrical recesses 41 at the right ends of these guideways.

The cover 37 also includes a projecting flange 43 which serves as a thumb grip and a recurved flange 44 which underlies the tongue 31 of the latch when the buckle is assembled. The cover 37 thus serves both as means to complete the enclosure of the operating parts of the buckle and as a release lever.

Figure 4:
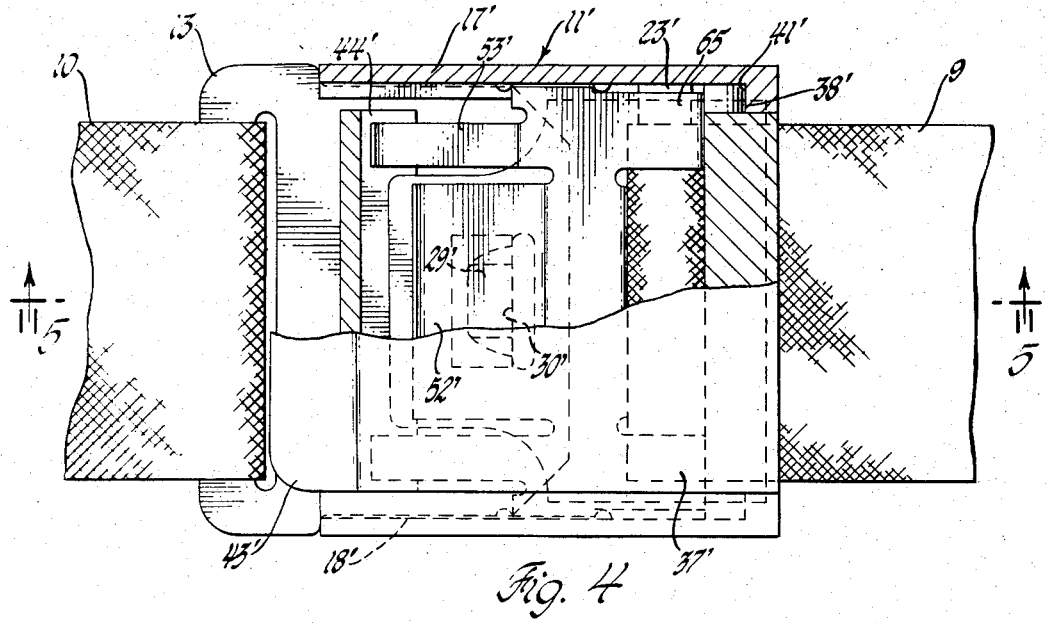
FIGURE 4 is a plan view, with parts cut away and in section, of a second seat belt buckle installation.
Figure 5:
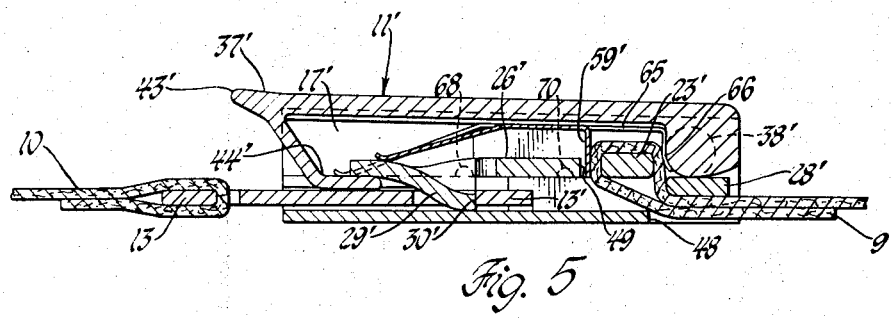
FIGURE 5 is a sectional view of the same taken on the plane indicated by the line 5—5 of FIGURE 4.
Figure 6:
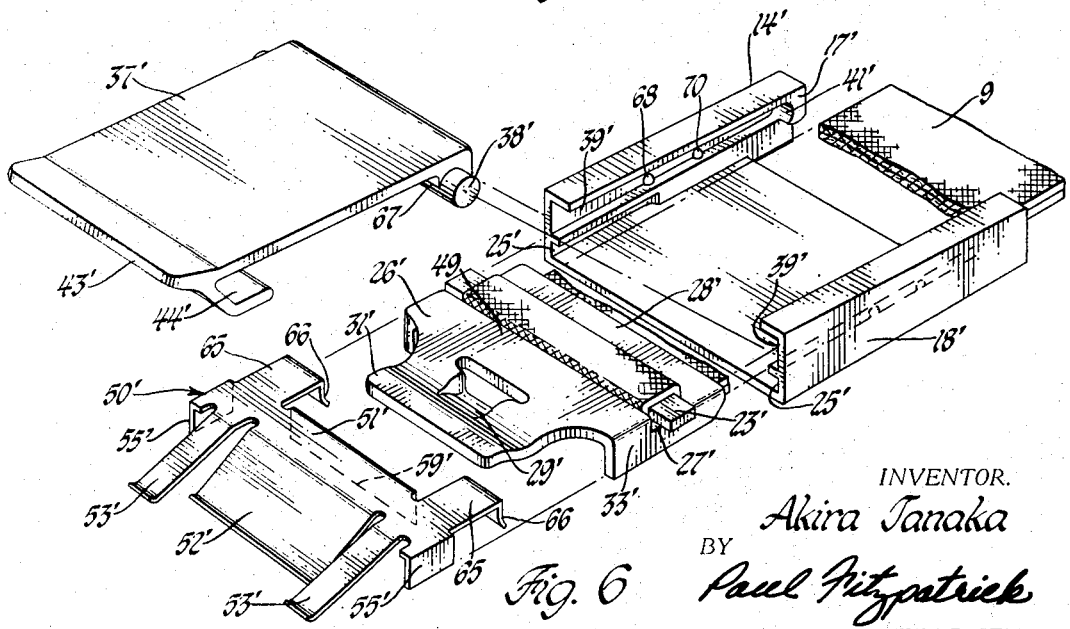
FIGURE 6 is an exploded view of the device of FIGURE 4.

By referring to the primed reference numerals in FIGURES 4, 5, and 6 in connection with the preceding description, the structure of the parts of the second species corresponding to those of the first species will be clear, and it will be apparent that the two structures as so far described are very much alike. There is a slight difference in the configuration of the cover and the base plate of FIGURE 4 is terminated at 48, short of the end of the buckle. The latch of FIGURE 4 has a stepped upper surface so that the bar 23' is disposed behind a shoulder at 49 on the latch. The crossbar 23' is not provided with heads. There are slight incidental differences in the dimensions or in the form of the parts, but these are immaterial.

The principal difference between the two species lies in the difference in the one remaining part of the assembly, which is a formed sheet metal device acting as a retainer, biasing springs, and a stop device in FIGURE 1. The corresponding part in FIGURE 4 provides these functions and additionally guides bar 23 and provides a direct retainer for the cover.

Figure 2:
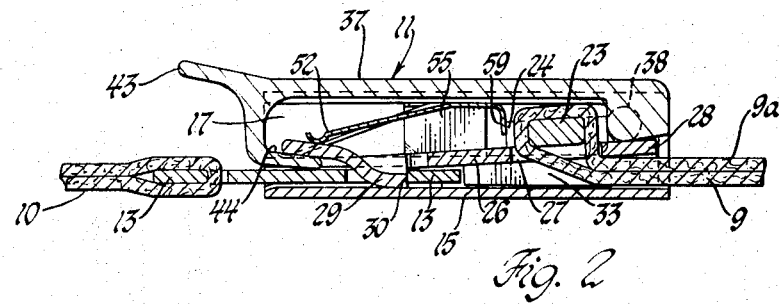
FIGURE 2 is a sectional view of the same taken on the plane indicated by the line 2—2 in FIGURE 1.
Figure 3:
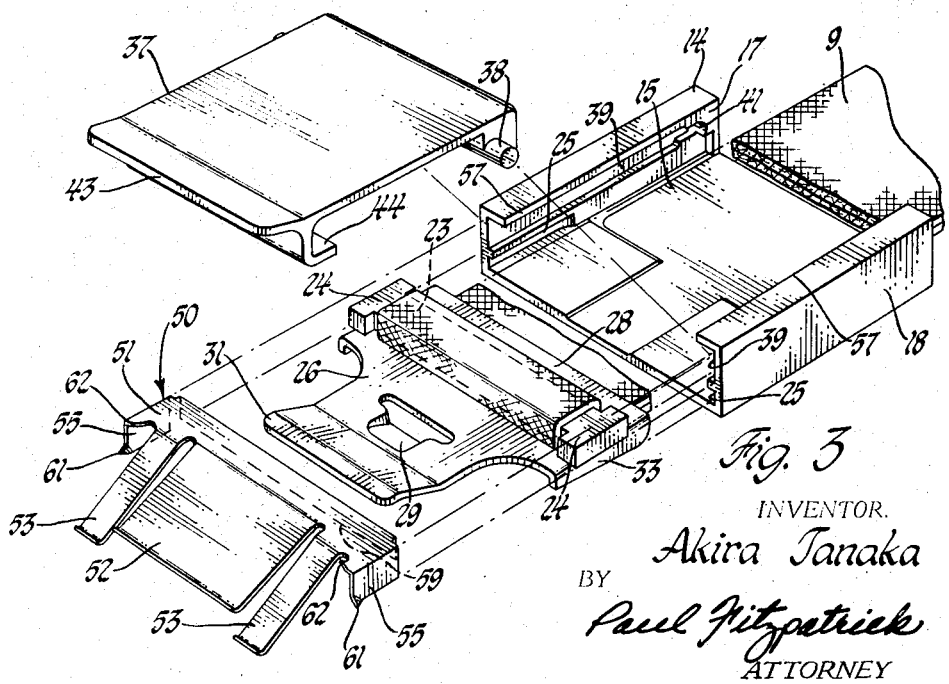
FIGURE 3 is an exploded view of the same.

Referring first to the structure of FIGURES 1 to 3, the retainer or spring member is identified as 50. It comprises an upper plate or sheet 51, a central leaf spring 52 which bears against the tongue 41 of the latch, and spring fingers 53 which bear against the flange 44 of the cover. The retainer also includes depending side flange portions or guide portions 55 which engage the side walls 17 and 18 and are dimensioned to slide into the guide channels 39 in the frame. The outer ends of the plate 51 engage the flanges 57 at the upper edge of the side walls and the lower edges of side portions 55 engage the lower wall of guide channels 39. The depth of the side portions 55 is such as to fit slidably in the grooves 39 and hold the spring member against rocking about an axis parallel to the crossbar 23. The spring member also has a depending rear flange 59 which is disposed against the heads 24 of the crossbar. This flange serves to retain and guide the crossbar and also limits the upward movement of latch 26 and cover 37 by engagement with the upper surface of the latch.

The end portions 53 provide also for retention of the spring member and the other parts of the buckle on the frame by virtue of bent-out sharp tangs 61 at the lower front corner of the side portions and similar tangs 62 at the upper front corner. In assembling the buckle, after the belt has been put into position through the latch, the spring member is laid on top of the latch and the cover is put into position with the pintles 38 to the right of the crossbar and with flange 44 underlying the tongue of the latch. This whole group of parts may then be forced into track 39 in the frame. The points 61 and 62 slide over the surface of the frame but, if an attempt is made to pull the structure out of the buckle, these bite into the relatively soft diecast wall and retain the parts of the buckle assembled. It should be noted that the spring does not carry the actual load of restraining the person, since this is transmitted from the lock plate 13 through the latch directly to the belt section 9.

In the device of FIGURES 4 to 6, a retainer or spring assembly 50' is provided which is in many respects similar to that just described. It comprises top plate 51', latch engaging spring 52', release biasing springs 53', side portions 55', and flange 59', corresponding to similarly numbered parts already described and serving the same functions. It may be noted that the flange 59' is of sufficient length to extend into the opening between the shoulder 49' on the latch and the belt portion 9 where it loops around the crossbar.

The retainer 50' includes also two fingers 65 which extend over the crossbar 23' and terminate in depending portions 66 which bear against the shoulder portion 67 of the cover to hold the pintles 38' in the sockets 41'. The flange 59' and fingers 66 thus provide a guide for the crossbar 23', and the retainer spring 50' acts directly against the cover to retain it, rather than acting through the heads 24 as in FIGURES 1 to 3.

The retainer of FIGURE 6 also provides a somewhat different mode of retention. Detent nubs 68 and 70 extend from the lower wall of guide channel 39' in position to engage the edges of the side portions 55'. This form of buckle is assembled in the same manner as that previously described except that the retainer straddles bar 23' and the loop of belt 9; but, in this case, when the parts are pushed into position in the frame, the side portions 55' are forced over the first detent 68 and spring back into place lodged between the detents 68 and 70, thus retaining the entire assembly.

It will be apparent from the foregoing that both species of the invention provide a very simple readily assembled structure in which the assembly is accomplished by simply fitting the belt to the latch, putting the latch cover and spring member in proper relation, and forcing them into the frame. This is feasible because the frame is not employed to carry any of the load imposed on the belt.

The detailed description of preferred embodiments of the invention for the purpose of explaining the principles thereof is not to be considered as limiting or restricting the invention, as many modifications may be made by the exercise of skill in the art.

I claim:
1. A restraining belt comprising, in combination,
   a buckle frame including a base plate and side walls
   a first belt section extending from one end of the frame
   a latch loosely mounted in the frame directly connected to the first belt section independently of the frame
   a second belt section including a lock plate insertable into the other end of the frame and engageable by the latch to retain the second belt section coupled to the first belt section so that tension in the belt is transmitted through the latch from the first to the second section
   a cover overlying the base plate and mounted on the frame
   the frame defining socket means receiving the cover open toward the said other end of the frame so that the cover is insertable from the said other end into engagement with the frame
   a retainer disposed between the cover and base plate and between the first belt section and the said other end of the frame
   the retainer having guide portions engaging the frame and being slidable into the frame from the said other end with the latch and cover
   and means on the retainer and frame interengaging to hold the retainer in position in the frame and thus retain the latch and cover in the frame.

2. A belt as recited in claim 1 in which the last-recited means is defined by tangs on the retainer adapted to dig into the frame.

3. A belt as recited in claim 1 in which the last-recited means is defined by detents on the frame cooperating with the guide portions of the retainer.

4. A belt as recited in claim in which the cover is pivoted in the socket means and is coupled to the latch for releasing the pawl.

5. A belt as recited in claim 4 in which the retainer is integral with spring means operative to bias the pawl into engagement with the lock plate and to bias the cover against movement to release the pawl.

6. A belt as recited in claim 4 in which the retainer includes finger means directly engaging the cover to retain it in the socket means.

7. A belt as recited in claim 4 in which the retainer includes means limiting the pawl-releasing movement of the cover.

8. A belt as recited in claim 1 in which the first belt section is doubled back
   the latch includes a bar extending across the first belt section
   the combination including also a crossbar in the frame substantially parallel to the bar, extending through the bight in the first belt section, and bearing against the latch.

References Cited
UNITED STATES PATENTS 3,197,832   8/1965   McCauley.
3,248,769   5/1966   Oliver.

BERNARD A. GELAK, *Primary Examiner.*

UNITED STATES PATENT OFFICE
CERTIFICATE OF CORRECTION

Patent No. 3,343,229                          September 26, 1967

Akira Tanaka

It is hereby certified that error appears in the above numbered patent requiring correction and that the said Letters Patent should read as corrected below.

Column 4, line 39, for "in claim in" read -- in claim 1 in --.

Signed and sealed this 8th day of October 1968.

(SEAL)
Attest:

Edward M. Fletcher, Jr.                      EDWARD J. BRENNER

Attesting Officer                              Commissioner of Patents